Feb. 5, 1952      W. A. PLEDGER      2,584,613
KITCHEN STOVE VENTILATOR

Filed May 7, 1948                             2 SHEETS—SHEET 1

INVENTOR.
WILLIAM A. PLEDGER
BY *Alexander Riaboff*
HIS ATTORNEY

Feb. 5, 1952     W. A. PLEDGER     2,584,613
KITCHEN STOVE VENTILATOR
Filed May 7, 1948     2 SHEETS—SHEET 2
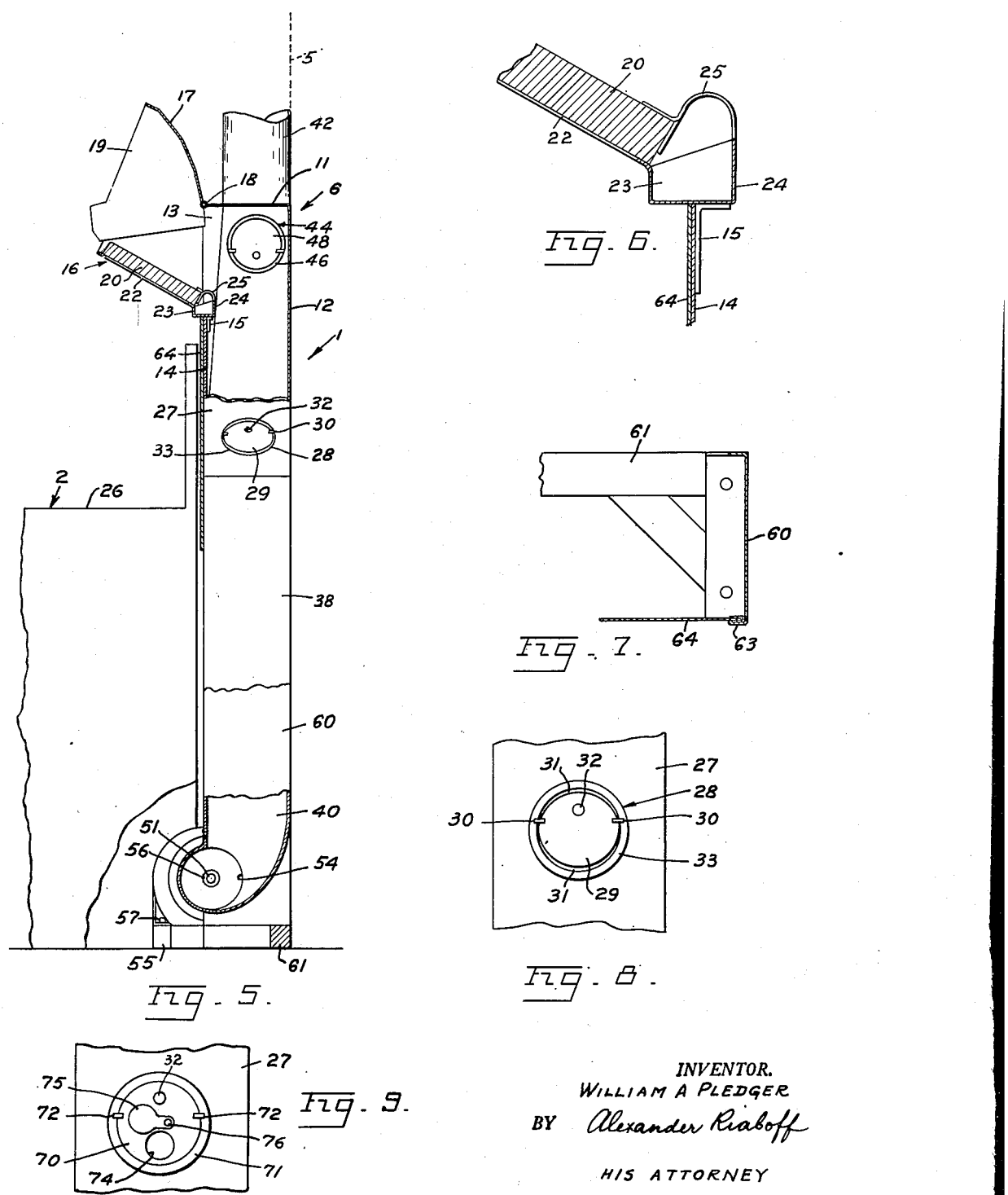
INVENTOR.
WILLIAM A PLEDGER
BY Alexander Riaboff
HIS ATTORNEY Patented Feb. 5, 1952

2,584,613

UNITED STATES PATENT OFFICE 2,584,613

KITCHEN STOVE VENTILATOR

William A. Pledger, San Francisco, Calif.

Application May 7, 1948, Serial No. 25,561

4 Claims. (Cl. 126—299)

This invention relates to a kitchen stove ventilator.

The object of this invention is to provide a kitchen stove ventilator adapted to draw hot air odors, evaporations and products of combustion from the kitchen stove directly into said device wherein said hot air, odors, evaporations and products of combustion are passed through a filter in which grease and moisture are condensed and the air is expelled through a flue into atmosphere.

Another object of this invention is to provide a device of the type described which is noiseless, vibrationless, and draws in and expells sufficient volume of air to take care of odors, evaporations and products of combustion produced by cooking.

Another object of the invention is to provide a ventilator of the type described having a by-pass valve in a flue, which valve stays open while the ventilator is inoperative thereby providing an open path for escaping gas and products of combustion.

Another object of this invention is to provide a ventilator having, in addition to the above mentioned by-pass valve, an automatic damper which also stays open when the ventilator is not in operation to provide an air passage from an oven to the flue, which passage is partially restricted when the ventilator is in operation.

Other objects and advantages will appear as the specification proceeds and the particular features of the invention will be specifically pointed out in the appended claims.

My device is illustrated in the accompanying drawings in which:

Fig. 5 is a side elevation of the device, partly in section, showing the same with the hood open.

Fig. 6 is a cross-section of a grease trough and filter supporting prongs.

Fig. 7 is a cross-section through a side support.

Fig. 8 is a front elevation of an automatic damper showing the same in a closed position; and Fig. 9 shows a modified form of the automatic damper.

Figure 1:
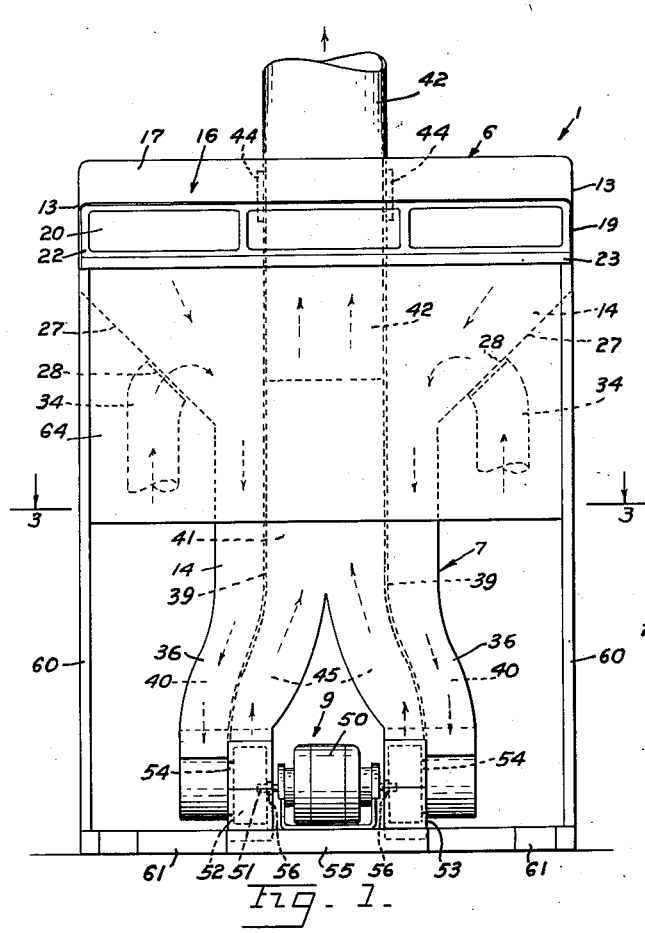
Fig. 1 is a front view of the device.
Figure 2:
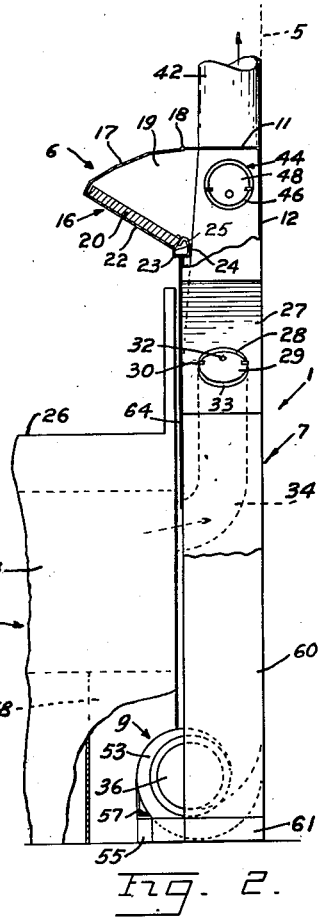
Fig. 2 is a side elevation of the device some parts being shown in section.
Figure 3:
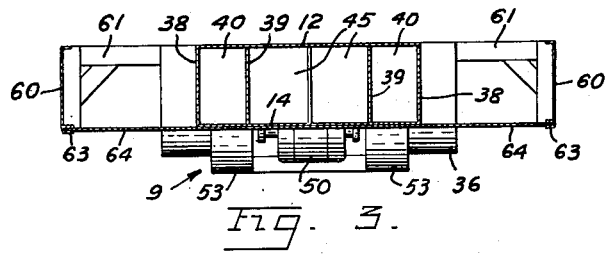
Fig. 3 is a sectional view taken on the line 3—3 of Fig. 1.
Figure 4:
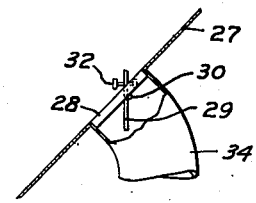
Fig. 4 is a side view of an automatic damper showing the same in open position.

In detail, my kitchen stove ventilator generally indicated at 1, is used in connection with a kitchen stove 2 which has one or two ovens 3 therein. The ventilator 1 is preferably placed between the stove 2 and the wall 5, a space which the law usually prescribes should separate a stove from a wall for the purpose of preventing fires.

The ventilator 1 is a hollow box-like structure, preferably made of sheet iron and consisting of a head 6, a body 7 supporting the head 6, and an air blowing unit 9 providing forced draft through the ventilator. The head 6 is comprised of a flat horizontal top 11, a vertical back 12, sides 13 and a front wall 14. The front of the head 6 is formed into a spout 16 by a hood 17 extending from the top 11 to which it is hinged at 18. The hood 17 has sides 19 integral therewith which slide in and out of the head 6 whenever the hood is closed, or opened as shown in Fig. 5. The spout 16 extends over and above the stove 2.

The lower side of the spout 16 is arranged at an angle in relation to the top of the stove 2 and is covered by a suitable filter 20 which rests on a filter frame 22. The filter 20 extends from one side of the spout 16 to the other and for convenience of handling preferably consists of three separate pieces arranged side by side. The filter 20 is especially designed to condense grease and evaporations from air passing through it. Integral with the frame 22, there is a trough 23 formed at the bottom of said frame. The back wall 24 of said trough is provided with prongs 25 which serve as abutments for the lower ends of said filters. The trough 23 extends the length of said ventilator 1 and rests on a front wall 14 thereof to which it is fastened by a plurality of brackets 15.

Fumes, hot air, evaporations and grease emanating from the top 26 of the stove 2 are drawn upwardly toward and through the filter 20 wherein grease and evaporations settle and gravitate therefrom into the trough 23.

The hood 17 may be opened by swinging it upwardly as shown in Fig. 5 and the filter 20 removed for cleaning purposes or inspection.

The head 6 has two bottom sides 27, which are inclined toward the center and each of them has an automatic damper 28 arranged therein. The latter consists of a disc 29 hinged at 30 above its central line and has an adjustable balancer 32 which is so adjusted as to permit said disc 29 to stay opened when the ventilator is not in operation and to close automatically when the air blowing unit 9 starts to operate. As Fig. 8 shows, the disc 29 is trimmed on the bottom and at its top so as to provide a small slot 31 between said disc and the damper frame 33. A pipe 34 connects said damper with the oven 3. The slots 31 between the disc 29 and the frame 33 are of such size as to withdraw undesired fumes and hot air from the oven 3 in sufficient quantities when the forced draft is in operation without unduly cooling said oven.

The top of the body 7 is integral with the head 6, and its lower portion is divided into two legs 36 to straddle the air blowing unit 9. The body consists of the front wall 14, the back 12, and sides 38 which connect with the sides 13.

There are two vertical partitions 39 extending through the body 7 by which it is divided into two side passages 40, connected with the head 6, and a central passage 41 which enters the head 6 and forms therein a flue 42. The lower portion of said central passage is split into two blower passages 45, each latter passage being arranged in a leg 36.

A pair of automatic valves 44 is arranged in the flue 42 in the head 6. The valves 44 are the same construction as the automatic dampers 28, except that the disc 43 closely fits the valve frame 46. The valves 44 remain open when there is no forced draft in the ventilator and automatically close when the air blowing unit 9 starts to operate.

If some cooking is done on the top of the stove 2 while the ventilator 1 is inoperative, a considerable portion of the hot air fumes and evaporation rising from the stove will pass through the ventilator into the head 6 and through the open automatic valves 44 into the flue 42. Fumes and hot air from the oven 3, when the ventilator 1 is inoperative, will pass through the pipe 34, the open automatic damper 28 into the head 6 and through the open automatic valve 44 into the flue 42.

Fig. 9 shows a modified form of the automatic damper in which a disc 70 tightly fits a frame 71 of said damper, said disc being rotatably supported by hinges 72. A hole 74 is provided in said disc which hole may be closed partially or completely by a slide 75 attached to said disc by a rivet 76. The hole 74, when the automatic damper is closed and the ventilator 1 is in operation, permits sufficient amount of air to be drawn from the oven 3 to prevent fumes and odors from spreading in the kitchen.

The air blowing unit 9 consists of an electric motor 50, centrally located between the legs 36 and having a shaft 51 extending on both sides of said motor. Each end of said shaft 51 carries a rotary blower 52 enclosed in a scroll 53 attached to a leg 36. The scroll 53 opens into the blower passage 45.

The side passages 40 terminate at the center of the scrolls 53 wherein openings 54 are provided in the side thereof. The blowers 52 are so rotated that air is drawn from the head 6 downwardly through the side passages 40, the openings 54, into said blowers, and therefrom is forced upwardly into the blower passages 45, central passage 41 and the flue 42.

The partial vacuum in the head 6 forces air around the stove 2 to move upwardly and into the spout 16, through the filter 20 and into said head.

The air moving into the spout 16 envelops the stove 2 completely, thus preventing fumes, grease and odors spreading in the kitchen and penetrating the other rooms in the house.

The motor 50 rests on a wooden frame 55 consisting of a plurality of wooden planks nailed and glued together. The motor 50 and the blowers 52 do not contact the scrolls 53 or any other part of the ventilator, as the motor shaft 51 passes through the holes 56 in the walls of the legs 36 without contacting the same. The legs 36 rest on the frame 55 and are attached thereto by bolts 57. This arrangement eliminates vibration and consequent noise of the ventilator body.

The body 7 of the ventilator is made narrow to fit the space between the stove 2 and the wall, which space is only about 6" wide. The motor 50 and the scrolls 53 are of somewhat bigger diameter than 6", and for that reason are arranged to protrude forwardly to occupy an empty space 58 back of the stove 2. The back of the ventilator 1 is straight so that the same may be set flat against the wall. The ventilator 1 may be built in a wall if so desired, with the spout and hood overhanging the stove.

The ventilator 1 is also supported by two side supports 60 extending from the head 6 to frame extensions 61 detachably attached to the frame 55. The support 60 has a flange 63 formed into a slot into which an apron 64 in the form of a metal sheet is slid. The apron 64 extends from the trough 23 downwardly below the top surface of the stove 2 to cover the body of the ventilator.

In order to insure efficient operation of the ventilator it is necessary that certain amounts of air be expelled from the kitchen every minute. It has been found by experiments that a single blower is insufficient to handle the desired quantity of air per minute in the device which is about 6" deep and expel said air through a standard flue which is about 6" in diameter. Two blowers driven by a single motor are sufficient to expel the desired amount of air from the kitchen, and to overcome the considerable static pressure in the flue caused by forcing a large volume of air therethrough.

I claim:

1. A ventilating device for a cooking stove, said device comprising a head; a spout extending away from the front of said head and having an open lower side; a filter adapted to condense grease and evaporations from air passing therethrough, said filter being arranged in the open lower side of said spout; a motor and a blower operated thereby; means forming a passage from said head to the blower for drawing air from the former to the latter; means forming an air passage from said blower; a flue connected with the last mentioned means and passing through said head into the atmosphere; an automatic valve arranged in the wall of the flue inside of the head, which valve is adapted to stay open when the blower is inoperative and to close when the same is in operation; and an automatic damper arranged in the head and adapted to stay open when the blower is inoperative and to have a restricted opening when the blower is in operation.

2. A ventilating device for a cooking stove, said device consisting of a head, a spout extending away from the front of said head and having an open lower side; a filter for condensing grease and evaporations from air passing therethrough, said filter being supported in the open lower side of the spout; a motor and a blower operated thereby, means forming a passage from said head to said blower for drawing air from the former to the latter, means forming a passage from said blower, a flue connected with the last mentioned means and passing through said head for passing air from said blower to the atmosphere; and an automatic valve in the wall of the flue inside of the head which valve is adapted to stay open when the blower is inoperative.

3. The combination of a stove having a cooking surface with a ventilating device consisting of a head above said stove; a spout extending away from the front of said head and having an open lower side above the cooking surface; a filter for condensing grease and evaporations from the air passing therethrough, said filter being mounted in the open lower side of the spout and directly facing the cooking surface; a motor and a blower operated thereby; means forming a passage from said head to said blower; and a flue connected with the last mentioned means and passing through said head for passing air from said blower to the atmosphere.

4. The combination of a stove having a cooking surface and an oven with a ventilating device comprising a head above said stove; a spout extending forwardly from said head and over said cooking surface and having an open lower side; a filter for condensing grease and evaporations from the air passing therethrough, said filter being mounted in said open lower side and facing directly the cooking surface; a motor and a blower operated thereby; means forming a passage from said head to said blower for passing air from said head to said blower; means forming a passage from said blower; a flue connected with said second mentioned means and passing through and outside of the head; an automatic valve mounted in the wall of the flue inside of said head which valve is adapted to stay open when the blower is inoperative and to close when the blower is in operation; an automatic damper mounted in the wall of the head and adapted to stay open when the blower is inoperative and to have a restricted opening when the blower is in operation; and a pipe connecting said oven with said damper.

WILLIAM A. PLEDGER.

REFERENCES CITED

The following references are of record in the file of this patent:

UNITED STATES PATENTS

| Number | Name | Date |
|---|---|---|
| Re. 22,228 | Petersen | Dec. 1, 1942 |
| 217,353 | Erdman | July 8, 1879 |
| 607,976 | Amos | July 26, 1898 |
| 1,477,590 | Powell | Dec. 18, 1923 |
| 1,671,524 | Gerdes | May 29, 1928 |
| 1,732,315 | Ray | Oct. 22, 1929 |
| 2,369,375 | Sonntag | Feb. 13, 1945 |
| 2,398,508 | Shoemaker | Apr. 16, 1946 |
| 2,417,842 | Sanford et al. | Mar. 25, 1947 |
| 2,482,952 | Warren | Sept. 27, 1949 |
| 2,494,146 | Spanos | Jan. 10, 1950 |
| 2,525,614 | Nelson et al. | Oct. 10, 1950 |

FOREIGN PATENTS

| Number | Country | Date |
|---|---|---|
| 370,160 | Great Britain | Apr. 7, 1932 |